United States Patent Office 3,463,709
Patented Aug. 26, 1969

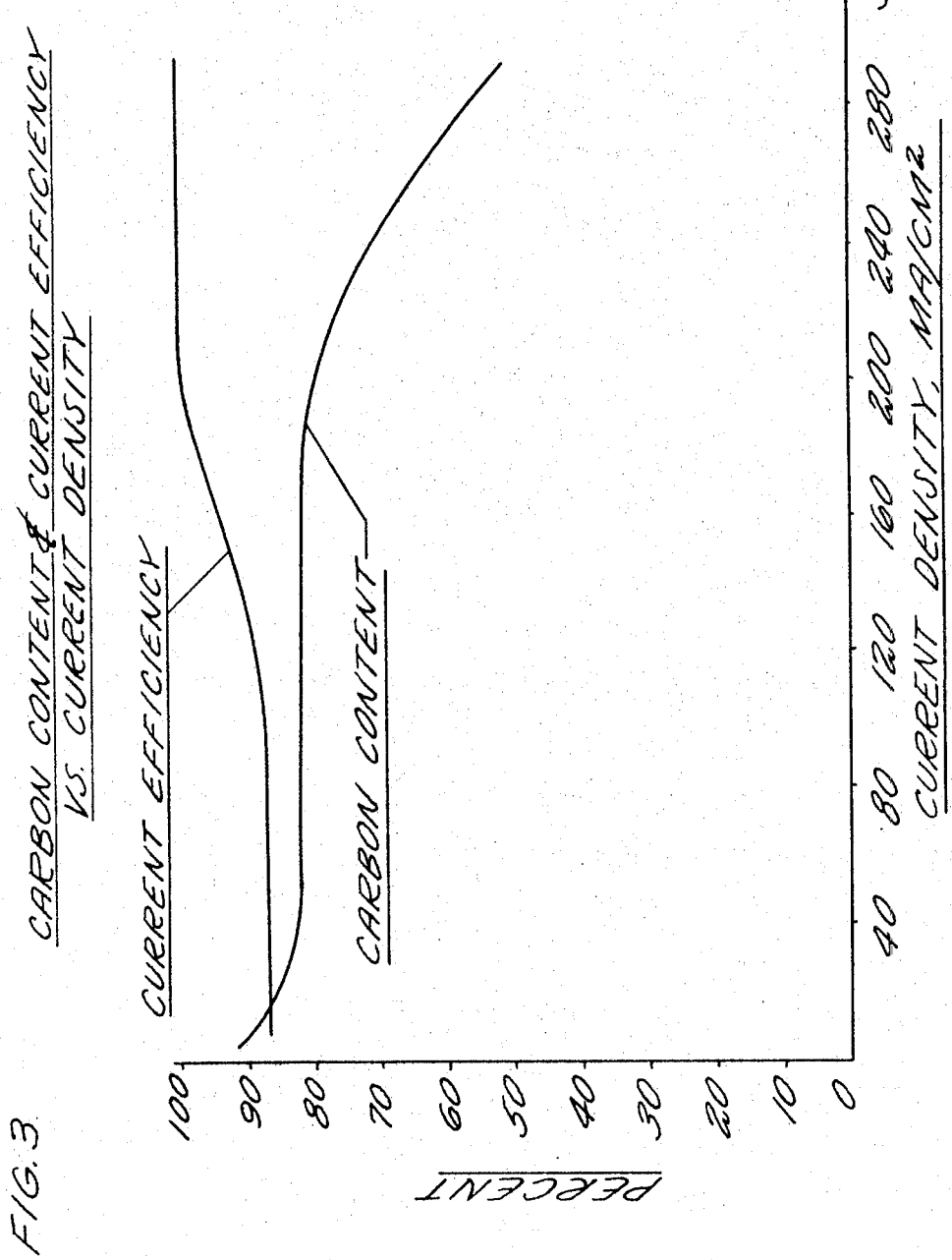

3,463,709
ELECTROLYSIS UTILIZING THIN FILM ELECTROLYTES
Sid Russell, Suffield, Conn., assignor to United Aircraft Corporation, East Hartford, Conn., a corporation of Delaware
Filed July 20, 1966, Ser. No. 566,677
Int. Cl. B01k 1/00
U.S. Cl. 204—60          9 Claims

ABSTRACT OF THE DISCLOSURE

An electrochemical process is described wherein the electrolyte is provided on an electrode in the form of a thin film which is exposed to a gas phase whose composition is controlled to minimize the effects of electrolyte depletion at the electrode resulting from the loss of ionic species through oxidation or reduction.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates in general to electrochemical processes and, more particularly, to those processes wherein one of the products of reaction is deposited from an electrolyte onto an electrode. It contemplates an improvement to existing electrochemical processes by providing the electrolyte on the electrode in the form of a thin film which is then exposed to a gas phase of controlled composition whereby the makeup of the electrolyte may be regulated or maintained to provide a deposit of high density and exceptional uniformity of composition and structure.

In the usual electrodeposition process two electrodes are immersed in an electrolyte and a potential is applied between them causing a current to flow. In the process one or more of the products of reaction may be deposited from the electrolyte onto an electrode, usually the cathode. Experience has demonstrated that, during the process, local changes in the electrolyte composiiton occur in the immediate area of the electrodes which reflect the loss of particular ionic species being oxidized or reduced. The rates of replacement by similar or different ions in these reactions is in accord with the relative diffusion rates from the bulk electrolyte and it is frequently not possible, at least at the higher current densities, to obtain a bulk electrolyte composition wherein the concentration gradients favor the balanced diffusion of the desired ionic species to and from the electrodes. Thus, it is often necessary to electrolyze at extremely low current densities, on the order of 10 milliamps/sq. cm., so that electrode environments do not undergo an undesirable change due to inappropriately related diffusion rates.

Recent experiments in the electrodeposition area have resulted in improved techniques which facilitate the regulation and maintenance of the electrolyte composition at the electrodes with a resultant improvement in the efficiency of the electrolytic processes. Furthermore, the low current density restriction has been eliminated through these improvements and means have been established for providing deposits of high density and exceptional uniformity and purity. The improvement involves the provision of a thin film of electrolyte on the electrode during electrolysis and exposing the thin electrolyte film to a carefully controlled gaseous atmosphere. In this manner it is possible to precisely regulate the electrolyte composition at the electrode and thereby enhance the process to favor the deposition of thicker and more uniform coatings at higher current densities than previously possible.

It is accordingly the principal object of the present invention to provide improvements to electrochemical processes through the use of thin film electrolytes and cover gas composition control.

Reference will be made in the following description to various aspects of the invention which can best be described by reference to the attached drawings in which:

FIG. 3 is a graph illustrating the effect of current density on cell efficiency and quality of the deposit.

Figure 1:
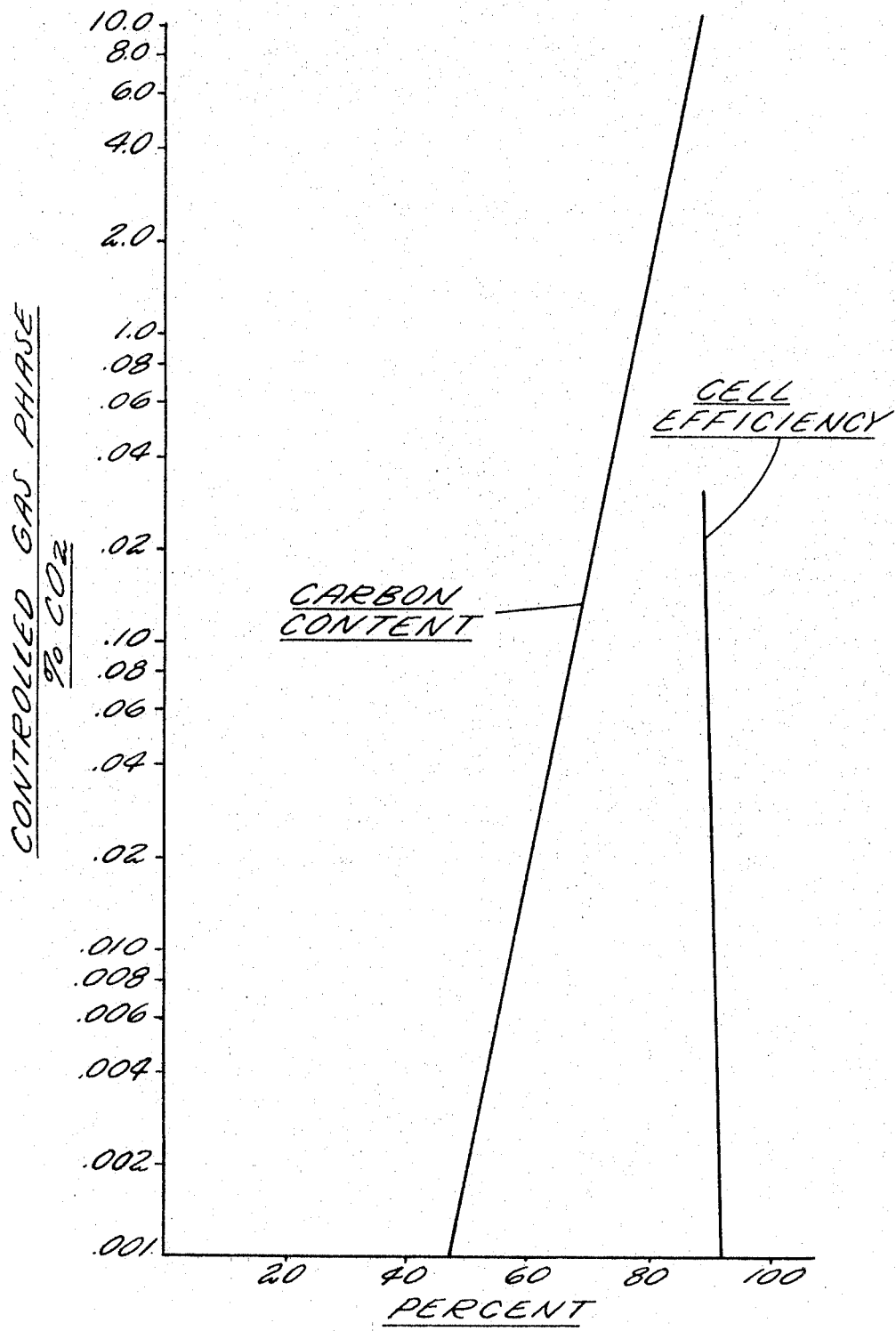
FIG. 1 is a graph illustrating the effect of the carbon dioxide control on the efficiency and product purity in a carbon deposition process.

For the sake of simplicity and brevity, the present invention will be described in connection with the deposition of graphitic carbon on a cathode in a process wherein carbon dioxide is absorbed from a gas stream and then decomposed as a result of chemical and electrochemical processes which yield oxygen at the anode and carbon at the cathode. While the advantages and process techniques are thus described, it will be obvious to those skilled in the art that the techniques discussed herein have much broader application in the art of electrochemistry and the fundamental principals will have application to those processes wherein other ingredients are utilized and other products are desired in electrolytic processes or plating methods.

It will be noted that, while the description makes primary reference to a particular electrodeposition process producing a solid of high density and exceptional uniformity, and with respect to the deposition of carbon principally, this particular process may alternatively be characterized as an oxygen reclamation process since in the reactions an oxygen liberation is effected at the anode. Accordingly, at various times in the following discussion, reference will be made either to a carbon deposition process or to an oxygen reclamation process.

Decomposition of carbon dioxide in a process yielding solid carbon and molecular oxygen may be accomplished by means of concurrent chemical and elctrochemical reactions in certain fused carbonate electrolytes. The fundamental concept is that certain alkali metals, particularly lithium, electrochemically reduced at the cathode in an electrolyte containing lithium carbonate, react chemically with carbon dioxide in solution to deposite solid carbon as an adherent layer on the surface of the cathode, returning lithium ions and oxide ions to the electrolyte. Thus, there is no substantial accretion of lithium at the cathode, since lithium ions are promptly returned to the ionic form. At the anode, oxide ions are discharged in the form of gaseous oxygen. Three oxide ions are produced at the cathode for each pair of oxide ions released at the anode and an extra ion is accordingly made available to combine with an absorbed molecule of carbon dioxide, replenishing as carbonate the carbon dioxide reduced at the cathode.

Although in the production of graphitic carbon, lithium carbonate is the primary ingredient of the electrolyte insofar as the requirements for the chemical processes and gaseous equilibria are concerned, lithium oxide and hydroxide may also be present. Furthermore, the relatively high melting point of lithium carbonate (726° C.) makes it advantageous to include suitable additives to permit operation at lower temperatures which appear preferable for the sake of inhibiting gaseous outputs at the cathode. Although carbon deposition has been effected between 375° and 800° C., the temperature of the electrolyte is preferably limited to 650° C., at which temperature the total pressure of gases required for equilibrium at the cathode is less likely to exceed ambient pressure.

From an engineering point of view it is desirable to operate the elctrolytic cell at as low a temperature as possible. In the carbon deposition experiments no limiting low temperature has been found on the basis of the chemical or electrochemical requirements of the system, so that the problem of reducing the melt temperature is primarily one of providing a combination of ingredients which will provide a low melting point; have acceptable conductivity and viscosity; and provide adequate solubility for the oxide developed at the cathode.

In some of the experiments conducted, a eutectic mixture of lithium carbonate and lithium chloride was used as the electrolyte. As hereinbofer indicated, this combination is not essential, but it has a convenient melting point (506° C.); is chemically stable under a small partial pressure of carbon dioxide; and provides a simple basis for discussing the fundamental requirements of a carbon deposition or oxygen reclamation process to which the principal advantages of the present invention may be related.

In the molten state at the preferred reaction temperature, the lithium carbonate-lithium chloride eutectic is highly ionized with lithium as the only cation, and anions including the carbonate, chloride and oxide which results from the dissociation of carbonate ions. Under equilibrium conditions, the dissociation of the carbonate anions will be determined by the ionic activities and by the partial pressure of carbon dioxide at the free surface of the electrolyte.

At the cathode, lithium ions will be reduced in accordance with the following equation:

$$4Li^+ + 4e \rightarrow 4Li$$

The atomic lithium will react with $CO_2$, available by dissociation of carbonate ions, to yield elementary carbon:

$$4Li + CO_2 \rightarrow 4Li^+ + 2O^= + C$$

At the anode, oxide ions will be oxidized to molecular oxygen as follows:

$$2O^= \rightarrow O_2 + 4e$$

At the anode, depletion of oxide ions by discharge of the gaseous oxygen gives rise to a local gradient in oxide concentration wherein eltcrolytic migration is balanced against a diffusion process which tends to restore the equilibrium. Similarly, at the cathode, where oxide ions are generated, a balance is attained between the rate of oxide generation and the rate of migration away from the cathode, resulting in a locally decreased carbon dioxide concentration.

In conventional electrodeposition processes, the reactions are necessarily effected at very low current densities and very slow deposition rates in compliance with the requirements herein before discussed for equilibrium of the gases at the cathode. Only in this way have the requirements for pure, dense deposits of carbon at the cathode been attained. At the higher deposition rates the deposit takes the form of a porous, cratered, fissured clinker clearly evidencing gas evolution during deposition. Furthermore, in such cases, there is clear evidence of elctrolyte and salt entrapment in the microstructure of the carbon deposit and this entrapment tends to inhibit the diffusion of oxide ions away from the sites of the cathodic reaction in addition to depleting the electrolyte.

Since it was impossible to provide carbon of the desired density and purity at reasonable growth rates in bulk electrolytes, an attempt was made to stabilize the electrolyte composition immediately surrounding the cathode. Tests wherein the electrolyte was circulated or agitated, and those wherein the cathode was agitated in the electrolyte, revealed that the desired solution could not be provided in this manner.

It was discovered, however, that the gaseous composition covering the electrolyte could be utilized to control the catholyte composition. This was accomplished in early experiments by periodically withdrawing a portion of the cathode from the bulk electrolyte so that the electrolyte could be exposed to the controlled atmosphere as a thin film adhering to the withdrawn portion as a result of wetting action. This permitted the electrolyte in the form of a thin film to rapidly achieve equilibrium with the controlled gas cover so that, by regulation of the partial pressures and relative ratios of carbon dioxide and, in these experiments, water vapor in the gas phase, it was possible to closely control the quality of the carbon deposit.

The deposits formed on cathodes oscillated in this manner revealed that the portion of the cathode which remained submerged displayed the typical, cratered deposit characteristic of the usual bulk electrolysis deposits, obviously a result of catholyte deviation from the preferred equilibrium composition. The carbon deposited on that portion of the cathode which was periodically withdrawn from the bulk electrolyte was of far greater density and purity, up to 78% carbon in early experiments as compared to 25% carbon in the clinker. Improvements in the process have since provided deposits of up to 97% purity.

The unexpected improvement in the quality of the product and overall efficiency of the process led to further experiments relative to the possibility of further control of the form of the carbon deposit through regulation of the gas phase composition. By appropriate change in the gas phase it was found possible to control the density of the deposit and, in some cases, the porous form was made to extend over the full length of the cathode. It is apparent that a combination of the electrolyte in the form of a thin film and a cover gas of controlled composition is necessary to provide the optimum form of the carbon deposit.

During the course of experimentation several different cathode configurations were used to provide the requisite thin film of electrolyte on the cathode. Those fabricated in the shape of an elongated rod and oscillated vertically with an axial motion whereby the dense carbon deposit was formed on the withdrawn portion, carried a clinker on the end which remained submerged in the bulk electrolyte. The formation of the clinker was prevented through the use of a rotating disc-type cathode which was mounted in the cell with its axis extending horizontally, a portion of the disc dipping into the electrolyte. As the disc cathode was rotated, portions thereof were alternatively withdrawn and submerged in the electrolyte, and the requisite thin film was accordingly provided at different periods of time over the entire electrode surface. As indicated, this electrode configuration forestalled the formation of the clinker and provided a carbon deposit of uniform density over the entire surface of the electrode.

While most of the preceding discussion has been directed to the formation of carbon and the qualities of the product, the techniques described are similarly advantageous to improved cell performance when viewed as an oxygen reclamation process. Since the cell efficiency is to a considerable extent dependent on the carbon-forming ability of the cathode, and since at high contamination levels this ability is much reduced, any improvement in the quality of the carbon deposit is reflected in improved efficiency and endurance of the cell.

Through the use of thin film electrolytes a technique has also been provided for local oxidation state control in electrolyte processes. The limited ionic diffusion rate of ionic species as a result of rapid saturation or depletion of the small volume of electrolyte adherent to the electrode permits extensive changes in local oxidation states.

It is evident that these are controllable in part by the rate of oscillation. In the above-described studies, it was noted that oxygen containing ions are evidently reduced to their lower oxide ion state in the thin film at the cathode rather than to a higher peroxide or oxyhalide oxidation state due to the small volume of electrolyte and the resultant concentrating of the reducing atmosphere at the cathode. Regulation of the oxidation state of ionic species is currently being further developed in a wide variety of applications since it is one of the more promising approaches to greater electrolytic process control throughout the industry.

The action of gas phase composition control on electrolyte constitution and in turn on the quality of cathode deposit were evident from experimental observations in a carbonate electrolyte containing some hydroxide. Although it was relatively simple to control the oxide ion concentration at the cathode, such as by current density, it proved more difficult to regulate the local carbonate to hydroxide ratio with any degree of certainty. At all times the electrolyte is seeking to achieve a balance among the carbonate, hydroxide and oxide ions in accord with the patrial pressures of carbon dioxide and water vapor to which it is exposed. At the cathode, oxide ions are generated continuously during electrolysis so that the catholyte tends generally to be richer in oxide than the bulk of the melt. Catholyte equilibrium depends upon the diffusion rates of carbon dioxide and water into the region and the oxide diffusion rate away from the cathode. Experimental results indicate that water diffusion rates are disproportionately faster than $CO_2$ through the bulk electrolyte. It further appears that the ratio of carbonate to hydroxide ions at the cathode determines whether carbon deposition is favored or whether gas evolution or some other interfering process prevails, and that the ratios of carbonate and hydroxide ions to oxide ions, as these reflect absolute partial pressures of carbon dioxide and water, determine whether cathodic gas pressures will be sufficiently high to generate bubbles. Exposure of the thin film of cathode electrolyte to a controlled carbon dioxide and water vapor gaseous environment continually reestablishes the required ionic balance. The effect of the carbon dioxide content in the cover gas with constant water vapor pressure on the efficiency of the cell and the purity of the carbon deposit is illustrated in the graph identified as FIG. 1.

In the carbon deposition method described herein, by way of example, the process is, therefore, seen to be dependent upon absorption of the carbon dioxide by the electrolyte. This absorption is in turn dependent upon a concurrent interaction between water vapor and the electrolyte. For the process to provide sufficient carbon dioxide for the electrolytic decomposition process desired, rather than to carry on some alternative process with water vapor, it was found necessary to control the equilibrium partial pressures of the carbon dioxide and water vapor to permit selective absorption of the carbon dioxide. In terms of equilibrium relations, therefore, the water vapor partial pressure in the covering atmosphere will preferably be maintained identical with that of the electrolyte. Through control of the relative water vapor content in the cover gas in relation to cell temperature and carbon dioxide content, the production of void forming gases at the cathode is accordingly minimized.

It is, of course, necessary in any electrode deposition process to utilize containment and electrode materials which themselves contribute no contaminants which might interfere with the process or with the quality of the product desired. The containment materials used in connection with the fused carbonate electrolytes are necessarily inert to the reactants to prevent upset of the electrolyte equilibrium and graphite, nickel, stainless steel, and gold-palladium crucibles have been used at various times, although the most satisfactory experience has been with alumina crucibles of high purity.

The choice of the anode material is especially difficult and in fact may well limit the choice of the melt composition. All of the previously mentioned metals suffer some dissolution in the process. Nickel, however, has been satisfactorily used in an electrolyte mixture based on the eutectic, due apparently to the formation of a protective oxide coating of reasonable stability thereon.

The cathode material selection is based on different considerations since the exposed electrode surface is faced or reacted with carbon shortly after electrolysis is initiated. Adherence of the carbon to the electrode surface is the prime consideration as far as the oxygen reclamation aspect of the process is concerned and favorable adherence has been obtained on cast iron, stainless steel, nickel, cobalt and manganese. From the carbon deposition standpoint, purity of the deposit in addition to adherence to the cathode are of prime importance, and excellent results have been obtained with both nickel and spectroscopic carbon cathodes.

Figure 2:
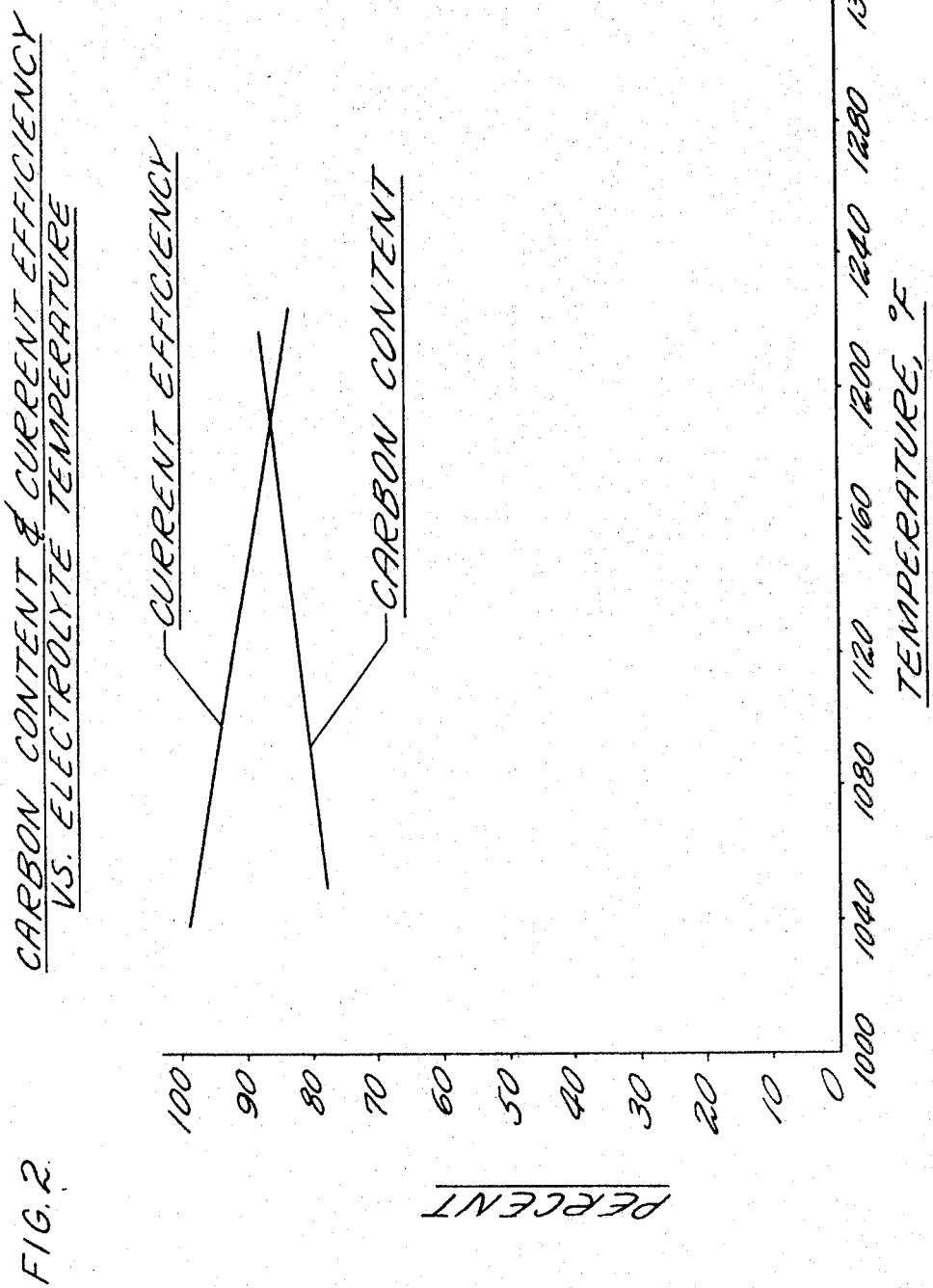
FIG. 2 is a graph illustrating the effect of electrolyte temperature on the efficiency of the cell and the quality of the deposit in a carbon production process.

Reference has heretofore been made to the effect of electrolyte temperature on the operation of the process. As clearly indicated in FIG. 2, while the cell efficiency decreases with increasing electrolyte temperature in the lithium carbonate-lithium chloride eutectic system, an increase in temperature effects a corresponding increase in the quality of the carbon deposit. It will be seen, therefore, that it may be advisable to operate at a higher or lower electrolyte temperature depending on whether the interest in the process relates to the deposition of carbon or to the reclamation of oxygen.

Cell efficiency and deposit purity are to a limited extent dependent upon the current density at which the process is run. Through the use of thin film electrolytes, higher current densities than previously possible may be utilized. The effects of current density in the process are illustrated in considerable detail in FIG. 3.

Experimentation has revealed that the techniques and advantages resultant from the use of thin film electrolytes and gas phase composition control are also applicable to the deposition of other components as well as carbon, and boron deposits of high quality have been produced in accordance with these teachings. In this case lithium fluoborate was substituted for lithium carbonate in the electrolyte and boron trifluoride was substituted for the carbon dioxide in the cover gas. The improved method was thus demonstrated to be directly applicable to the boron process.

Nor is this invention necessarily confined to those processes wherein a deposit of macroscopic thickness is desired. Highly efficient surface treatments, such as siliciding, using a gaseous atmosphere containing silicon fluoride, or nitriding with one of the nitrogen oxide gases, may be advantageously done through utilization of the techniques taught herein. Nor is the invention confined to the fused salt electrolytes, but includes the aqueous and organic electrolyte baths as well.

Accordingly, while the invention has been described in connection with several preferred examples, in practice and utility it need not be restricted thereto, and many modifications and uses will be obvious to those skilled in the art from the description and through practice of the invention. The true spirit and scope of the invention will be understood to be measured by the definition set forth in the appended claims.

What is claimed is:
1. In an electrolytic process utilizing an electrolytic cell having a pair of electrodes in contact with an electrolyte, the method of maintaining a stable catholyte composition comprising the steps of:
   providing a cover gas of controlled composition over the electrolyte,
   oscillating the cathode to periodically withdraw a portion from the bulk electrolyte, the electrolyte adhering as a thin film on the withdrawn portion thereby being exposed to the cover gas, and regulating the composition of the cover gas to maintain a stable catholyte composition in the thin film through a diffusion mechanism.

2. In an electrochemical process wherein one of the reaction products is deposited from an electrolyte onto an electrode, the improvement which comprises:
providing the electrolyte on the electrode in the form of a thin film,
exposing the electrolyte to a cover gas,
and regulating the composition of the cover gas to control the composition of the electrolyte through a thin film diffusion mechanism.

3. In an electrochemical process wherein one of the reaction products is produced from an electrolyte at an electrode, the improvement which comprises:
providing the electrolyte on the electrode in the form of a thin film,
exposing the electrolyte to a controlled gas phase,
and regulating the composition of the gas phase to maintain a stable electrolyte composition at the electrode through a thin film diffusion mechanism.

4. In an electrochemical process wherein one of the reaction products is deposited from an electrolyte onto a movable electrode, the improvement which comprises:
providing a cover gas of controlled composition over the electrolyte,
periodically withdrawing a portion of the electrode from the bulk electrolyte to expose the withdrawn portion with adhering film of electrolyte to the cover gas,
and regulating the composition of the cover gas to control the electrolyte composition in the thin film.

5. In the production of graphite carbon from a fused electrolyte in an electrodeposition process, the improvement which comprises:
providing a cover gas over the fused electrolyte, the cover gas containing carbon dioxide as a principal reactive ingredient and having the carbon dioxide dispersed in an inert gas,
providing a movable cathode,
periodically withdrawing a portion of the movable cathode from the electrolyte and exposing the electrolyte adhering as a thin film on the withdrawn portion to the cover gas,
and regulating the carbon dioxide content of the cover gas to maintain the composition of the electrolyte substantially constant in the thin film through a diffusion mechanism.

6. The improvement according to claim 5 wherein the cover gas contains water vapor in addition to carbon dioxide, the equilibrium partial pressures of the carbon dioxide and water vapor being respectively maintained at levels to permit selection absorption of the carbon dioxide in the electrolyte.

7. The improvement according to claim 6 wherein the electrolyte consists essentially of a mixture of salts, including a carbonate salt, containing lithium as the predominant cation on a molar basis.

8. The improvement according to claim 6 wherein the electrolyte consists essentially of a mixture of salts wherein lithium carbonate is the principal component, the salt mixture having a melting point not exceeding 650° C.

9. The improvement according to claim 5 wherein the electrolyte consists essentially of a eutectic mixture of lithium carbonate and lithium chloride.

References Cited

UNITED STATES PATENTS

| 1,910,017 | 5/1933 | Hulin | 204—245 XR |
| 2,706,153 | 4/1955 | Glasser | 204—61 XR |
| 3,085,053 | 4/1963 | Taylor | 204—60 |
| 3,115,427 | 12/1963 | Rightmire | 136—86 |

FOREIGN PATENTS 4,019   9/1881   Great Britain.

JOHN H. MACH, Primary Examiner

D. R. VALENTINE, Assistant Examiner

U.S. Cl. X.R.

204—39